United States Patent
Li et al.

(10) Patent No.: US 9,038,032 B2
(45) Date of Patent: May 19, 2015

(54) SYMBOLIC EXECUTION AND AUTOMATIC TEST CASE GENERATION FOR JAVASCRIPT PROGRAMS

(75) Inventors: Guodong Li, San Jose, CA (US);
Praveen K. Murthy, Fremont, CA (US);
Indradeep Ghosh, Cupertino, CA (US);
Sreeranga P. Rajan, Sunnyvale, CA (US)

(73) Assignee: Fujitsu Limited, Kawasaki-shi (JP)

( * ) Notice: Subject to any disclaimer, the term of this patent is extended or adjusted under 35 U.S.C. 154(b) by 186 days.

(21) Appl. No.: 13/481,594

(22) Filed: May 25, 2012

(65) Prior Publication Data

US 2013/0318503 A1    Nov. 28, 2013

(51) Int. Cl.
G06F 9/44    (2006.01)
G06F 9/45    (2006.01)
G06F 11/36    (2006.01)
G06F 9/455    (2006.01)

(52) U.S. Cl.
CPC ........ G06F 11/3684 (2013.01); G06F 9/45529 (2013.01)

(58) Field of Classification Search
None
See application file for complete search history.

(56) References Cited

U.S. PATENT DOCUMENTS

| | | | | |
|---|---|---|---|---|
| 5,784,553 | A * | 7/1998 | Kolawa et al. | 714/38.1 |
| 6,823,504 | B1 * | 11/2004 | Sokolov | 717/136 |
| 6,983,238 | B2 * | 1/2006 | Gao | 717/136 |
| 8,332,828 | B2 * | 12/2012 | Vargas | 717/137 |
| 8,504,997 | B2 * | 8/2013 | Tkachuk et al. | 717/124 |
| 8,543,986 | B2 * | 9/2013 | Murthy et al. | 717/124 |
| 8,572,574 | B2 * | 10/2013 | Ghosh et al. | 717/126 |
| 8,738,931 | B1 * | 5/2014 | Funk | 717/137 |
| 8,806,453 | B1 * | 8/2014 | Bodkin et al. | 717/136 |
| 2001/0056460 | A1 * | 12/2001 | Sahota et al. | 709/201 |
| 2004/0103394 | A1 * | 5/2004 | Manda et al. | 717/126 |
| 2004/0158820 | A1 * | 8/2004 | Moore et al. | 717/136 |
| 2005/0034104 | A1 * | 2/2005 | Pugh et al. | 717/124 |
| 2009/0089759 | A1 * | 4/2009 | Rajan et al. | 717/126 |
| 2010/0333076 | A1 * | 12/2010 | Cataldo et al. | 717/140 |
| 2011/0016449 | A1 * | 1/2011 | Yao et al. | 717/106 |

(Continued)

OTHER PUBLICATIONS

Saxena, P. Akhawe, D. Hanna, S. Mao, F. McCamant, S. and Song, D.; A Symbolic Execution Framework for JavaScript. Technical Report No. UCB/EECS-2010-26. [Online] Published Mar. 8, 2010. [Retrieved from the Internet] <URL: http://www.eecs.berkeley.edu/Pubs/TechRpts/2010/EECS-2010-26.pdf> 20 pages.*

(Continued)

*Primary Examiner* — Thuy Dao
*Assistant Examiner* — Ravi K Sinha
(74) *Attorney, Agent, or Firm* — Baker Botts L.L.P.

(57) ABSTRACT

A method includes, by one or more computing devices, determining JavaScript statements to be evaluated, parsing the JavaScript statements, translating the JavaScript statements into Java bytecodes and JavaScript-specific instructions, executing the Java bytecodes in a Java execution engine, calling a JavaScript run-time engine from the Java execution engine, handling one or more semantic operations associated with the JavaScript-specific instructions through use of the JavaScript run-time engine, and providing return values to the Java execution engine. The statements are configured for execution on a computing device. The set of Java bytecodes and JavaScript-specific instructions is configured to conduct symbolic execution of one or more portions of the JavaScript statements. The symbolic execution is configured to evaluate the JavaScript statements.

12 Claims, 4 Drawing Sheets

(56) References Cited

U.S. PATENT DOCUMENTS

| | | | |
|---|---|---|---|
| 2011/0239104 A1* | 9/2011 | Prasad et al. | 715/234 |
| 2012/0151371 A1* | 6/2012 | Kominac et al. | 715/740 |
| 2013/0055210 A1* | 2/2013 | Murthy et al. | 717/126 |
| 2013/0326491 A1* | 12/2013 | Caira et al. | 717/146 |

OTHER PUBLICATIONS

Saxena, P.; Akhawe, D.; Hanna, S.; Feng Mao; McCamant, S.; Song, D., A Symbolic Execution Framework for JavaScript, [Online] 2010, Security and Privacy (SP), 2010 IEEE Symposium on, May 16-19, 2010, [Retrieved from the Internet] <http://ieeexplore.ieee.org/stamp/stamp.jsp?tp=&arnumber=5504700&isnumber=5504699> pp. 513-528.*

Artzi, S.; Dolby, J.; Jensen, S.H.; Moller, A.; Tip, F., A framework for automated testing of javascript web applications, [Online] 2011, Software Engineering (ICSE), 2011 33rd International Conference on, May 21-28, 2011, [Retrived from the Internet] <http://ieeexplore.ieee.org/stamp/stamp.jsp?tp=&arnumber=6032496&isnumber=6032438> pp. 571-580.*

Salva, S.; Laurencot, P., Automatic Ajax Application Testing, [Online] 2009, Internet and Web Applications and Services, 2009. ICIW '09. Fourth International Conference on , May 24-28, 2009, [Retrieved from the Internet] <http://ieeexplore.ieee.org/stamp/stamp.jsp?tp=&arnumber=5072524&isnumber=5072480> pp. 229-234.*

Wassermann et al., Dynamic test input generation for web applications, [Online] 2008, In Proceedings of the 2008 international symposium on Software testing and analysis (ISSTA '08), [Retrieved from the Internet]<http://doi.acm.org/10.1145/1390630.1390661> pp. 249-260.*

* cited by examiner

SYMBOLIC EXECUTION AND AUTOMATIC TEST CASE GENERATION FOR JAVASCRIPT PROGRAMS

TECHNICAL FIELD

The present invention generally relates to software verification and, more particularly, to symbolic execution and automatic test case generation for JavaScript programs.

BACKGROUND

A software application may include any number of modules (e.g., classes, functions, procedures, subroutines, or code blocks), and each module may be tested or validated individually. A software module may be tested or validated manually or automatically. In the former case, a person (e.g., a software testing engineer) may manually design test cases for the software module based on the design specification of the module, execute the module under the test cases, and check for module behavior or output that does not agree with the specification of the module in view of the test cases. In the latter case, a software-testing tool, implemented as computer software or hardware, may automatically generate test cases for a software module under test, execute the module under test while simulating the test cases, and check for module behavior or output that does not agree with the specification of the module in view of the test cases. The sheer complexity of modern software often renders manual generation or design of test cases inadequate for completely testing the software.

Java is an object-oriented programming language. It may be used to create, for example, applications and applets. An applet may be downloaded as a separate file in an Internet browser alongside a hypertext-markup-language ("HTML") document to provide added functionality to a website. The applet may appear to be embedded in an HTML page. However, the applet may run in, for example, a container such as a Java Virtual Machine rather than in the browser or other application running the HTML page. Java may be compiled into machine code.

JavaScript is a scripting language. JavaScript typically resides in HTML documents. JavaScript is not compiled into machine code but is interpreted by an application running, for example, an HTML file together with a JavaScript interpreter. JavaScript may not create applets or standalone applications. JavaScript is an object-based, dynamic typing, static scope, and higher-order language.

SUMMARY

In one embodiment, a method includes, by one or more computing devices, determining JavaScript statements to be evaluated, parsing the JavaScript statements, translating the JavaScript statements into Java bytecodes and JavaScript-specific instructions, executing the Java bytecodes in a Java execution engine, calling a JavaScript run-time engine from the Java execution engine, handling one or more semantic operations associated with the JavaScript-specific instructions through use of the JavaScript run-time engine, and providing return values to the Java execution engine. The statements are configured for execution on a computing device. The set of Java bytecodes and JavaScript-specific instructions is configured to conduct symbolic execution of one or more portions of the JavaScript statements. The symbolic execution is configured to evaluate the JavaScript statements.

In another embodiment, a system includes a computer-readable medium including computer-executable instructions and one or more processors coupled to the computer-readable medium and operable to read and execute the instructions. The one or more processors are operable when executing the instructions to determine JavaScript statements to be evaluated, parse the JavaScript statements, translate the JavaScript statements into Java bytecodes and JavaScript-specific instructions, executing the Java bytecodes in a Java execution engine, call a JavaScript run-time engine from the Java execution engine, handling one or more semantic operations associated with the JavaScript-specific instructions through use of the JavaScript run-time engine, and provide return values to the Java execution engine. The statements are configured for execution on a computing device. The set of Java bytecodes and JavaScript-specific instructions is configured to conduct symbolic execution of one or more portions of the JavaScript statements. The symbolic execution is configured to evaluate the JavaScript statements.

In yet another embodiment, an article of manufacture includes a computer-readable medium and computer-executable instructions carried on the computer-readable medium. The instructions are readable by a processor. The instructions, when read and executed, cause the processor to determine JavaScript statements to be evaluated, parse the JavaScript statements, translate the JavaScript statements into Java bytecodes and JavaScript-specific instructions, executing the Java bytecodes in a Java execution engine, call a JavaScript run-time engine from the Java execution engine, handling one or more semantic operations associated with the JavaScript-specific instructions through use of the JavaScript run-time engine, and provide return values to the Java execution engine. The statements are configured for execution on a computing device. The set of Java bytecodes and JavaScript-specific instructions is configured to conduct symbolic execution of one or more portions of the JavaScript statements. The symbolic execution is configured to evaluate the JavaScript statements.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
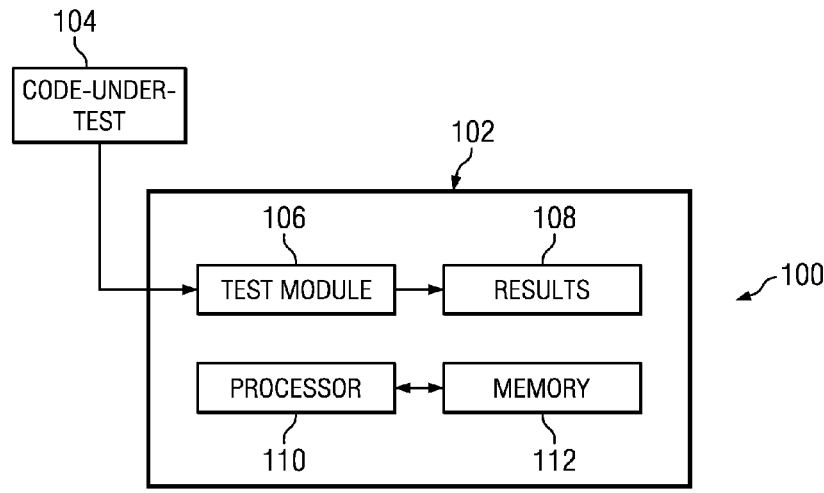
FIG. 1 is an example embodiment of a system for symbolic execution and automatic test case generation for JavaScript programs.

FIG. 1 is an example embodiment of a system 100 for symbolic execution and automatic test case generation for JavaScript programs. System 100 may be configured to verify, validate, or otherwise test code-under-test 104 and produce results 108 from such tests. During such tests, system 100 may be configured to symbolically execute JavaScript code and automatically generate test cases resulting from the symbolic execution. The JavaScript code may make references to web-related components native to JavaScript processing environments. System 100 may be configured to evaluate such test cases in order to validate different paths of execution of code-under-test 104 discovered during symbolic execution.

System 100 may include an electronic device 102 configured to symbolically execute one or more portions of code-under-test 104. Further, electronic device 102 may be configured to automatically generate test cases resulting from the symbolic execution. In one embodiment, electronic device 102 may be configured to evaluate the resulting test cases to validate code-under-test 104. Electronic device 102 may be configured to produce results 108 reflecting the results of testing code-under-test 104.

Electronic device 102 may be configured to receive code-under-test 104 in any suitable way such as, for example, electronically over a network, through loading or entering by a user, or accessing local or remote storage. Electronic device 102 may be configured to provide results 108 in any suitable way such as, for example, sending results 108 over a network, display to a user, or storing to a local or remote storage.

Electronic device 102 may include a test module 106 configured to perform any aspect of testing code-under-test 104 for electronic device 102 or system 100, such as symbolically executing the one or more portions of code-under-test 104, automatically generating resulting test cases, or evaluating the resulting test cases. Test module 106 may be implemented by any suitable mechanism, such as a program, software, software-as-service, analog or digital circuitry, or any combination thereof. Test module 106 may be resident on electronic device 102. Test module 106 may be implemented as a complete module, or as a sub-module as part of a larger system. In software form, some or all of test module 106 may be implemented by, for example, logic, instructions, binaries, object code, libraries, functions, programs, applications, scripts, executables, or other suitable digital entity.

Electronic device 102 may include any device configurable to interpret and/or execute program instructions and/or process data, including but not limited to: a computer, desktop, server, laptop, personal data assistant, or smartphone. Electronic device 102 may include a processor 110 coupled to a memory 112. Some or all of test module 106 may be embodied in logic or instructions resident in memory 112 for execution by processor 110. Processor 110 may include, for example, a microprocessor, microcontroller, digital signal processor (DSP), application specific integrated circuit (ASIC), or any other digital or analog circuitry configured to interpret and/or execute program instructions and/or process data. Processor 110 may interpret and/or execute program instructions and/or process data stored in memory 112. Memory 112 may comprise any system, device, or apparatus configured to retain program instructions and/or data for a period of time (e.g., computer-readable media).

Code-under-test 104 may include, for example, a hypertext-markup-language ("HTML") web page or file, software, software code, libraries, applications, scripts, active or passive web content, or other logic or instructions for execution upon an electronic device. Code-under-test 104 may include a complete instance or a portion of such software. In one embodiment, code-under-test 104 may include JavaScript code. In another embodiment, code-under-test 104 may include references to web-related components such as objects and application programming interfaces of a web browser or an HTML document object model ("DOM"). Such web-related components may be present in JavaScript execution environments.

In one embodiment, code-under-test 104 may not require any modifications in order to be symbolically executed. In another embodiment, code-under-test 104 may require such modifications in order to be symbolically executed by, for example, test module 106. The modification may include designations of particular variables, parameters, or other portions of code-under-test 104 which test module 106 is to symbolically execute. The designations may be added, for example, as additional, specific instructions in code-under-test 104 or as rewrites of variable, object, class, or other entity names. The designations may be made using a naming convention, such as "sym_xxx" wherein "xxx" is the original name of the entity. The designations may be made by an application, user, or other entity preparing code-under-test 104 for testing with system 100. Any suitable changes may be made to code-under-test 104 in order to indicate that some or all of code-under-test 104 is to be symbolically executed. For the purposes of the use of code-under-test 104 in FIG. 1 and subsequent figures, it may be assumed that such designations, if necessary, have already been made.

Using symbolic execution, test module 106 may be configured to validate code-under-test 104 in any suitable way. For example, test module 106 may evaluate whether code-under-test 104 can be executed in a manner consistent with design constraints and acceptable operating parameters. Test module 106 may symbolically execute code-under-test 104 to determine, for example, programming bugs, assertion violations, functional correctness, security violations, or other indications of valid operation or errors. The determined status may be stored or reported in results 108.

Results 108 may be implemented by data, files, or any other suitable mechanism for portraying, storing, or otherwise indicating the result of the operation of test module 106. Results 108 may include, for example, test cases generated by test module 106 through symbolic execution of code-under-test 104 or indications of validation or errors in code-under-test 104 determined by evaluating the test cases.

Despite the similar name, many differences exist between JavaScript and Java. JavaScript code and Java code are not equivalent. A piece of software enabled to use Java may not necessarily be enabled to use JavaScript, and vice-versa. Java may be used to create stand-alone applications or applets, while JavaScript may not, residing instead within an existing HTML document. In some instances, JavaScript may be considered a scripting language rather than a programming language.

Further, while Java code and JavaScript code may use some similar vocabulary or syntax constructions, an engine or other entity requiring Java code cannot run JavaScript code, nor can an engine or other entity requiring JavaScript code run Java code. The similar vocabulary or syntax constructions may arise from their common ancestry with the C programming language rather than through common development. The semantics and programming language constructs between the languages may differ. For example, Java may have static typing while JavaScript may have dynamic typing. Thus, JavaScript variables may hold an object of any type. JavaScript is weakly typed whereas Java is strongly typed. When used, Java-based applications are loaded from a compiled bytecode created from the original Java code, whereas JavaScript is loaded into an application in its original source code form. Java is object-oriented while JavaScript is object-based; Java's objects are class-based and use inheritance whereas JavaScript's objects are prototype-based, without classes or inheritance.

In addition, JavaScript may contain any number of commands, statements, or functional features that are not present in Java. Some of these commands may include interfaces to the interpreter or environment in which the JavaScript code runs. A Java compiler would be unable to compile and execute such commands. The JavaScript commands to the environment may include, for example, accessing events anywhere in an HTML page such as controlling the "back" button on the browser. In contrast, compiled Java code in an applet may only access events within the applet container.

Java code may require compilation into bytecodes, which may be downloaded for execution into an entity such as a Java Virtual Machine. The actual electronic device on which the Java code is to execute may be unknown, and thus generating pure machine code may be impractical. However, a given electronic device may include such a Java Virtual Machine, which may be able to accept Java bytecodes and execute them on the particular electronic device.

In contrast, JavaScript code may be interpreted as part of the file (such as an HTML file) in which it resides. Download of the HTML file may thus inherently download the JavaScript code, which is interpreted as the HTML page is loaded and displayed. Thus, Java code cannot simply be interchanged with JavaScript code, nor can Java bytecodes simply be interchanged with JavaScript code.

As described above, JavaScript code in an HTML file may make references to various web-related components such as an HTML DOM or objects and application programming interfaces of a web browser. The web-related components may normally be present in JavaScript execution environments and JavaScript code may be written assuming that facilities for their use are present. For example, a JavaScript reference may be made to the window in which it is executing, thus invoking methods or objects without even creating instances of them. Java-executing entities might not be able handle such references, as no provisions are given for understanding their structure or function.

The incompatibility of JavaScript code and Java code means that many existing programs, applications, techniques, libraries, and other tools created for one language may be unavailable for the other. For example, software validation solvers may exist for Java code that has been symbolically executed into test cases, but these are unavailable to validate JavaScript code. Further, a complete translation from one code to the other code may be unfeasible or impossible. Some given commands or structures in one language may have no equivalent in the other. For example, environmental commands in JavaScript for controlling the "back" button of a browser, as described above, may have no equivalent in Java. The creation, typing, and morphing of variables may mean that variable use can be entirely different between the languages. In addition, JavaScript-executing entities may be unable to perform symbolic execution, while symbolic execution modules and associated solvers may exist for Java code.

Accordingly, in order to symbolically execute code-under-test 104, test module 104 may be configured to utilize a hybrid of Java and JavaScript processing in order to accept code-under-test 104 containing JavaScript and references to non-Java web-related components such as HTML DOMs or browser objects and functions. Any suitable hybrid of Java and JavaScript processing may be used in order to symbolically execute code-under-test 104. Various embodiments of such hybrids of Java and JavaScript processing are shown in more detail in, for example, FIG. 2 below.

In operation, test module 106 may be executing on electronic device 102. Test module 106 may be accessible to local or remote users. Code-under-test 104 may be provided to electronic device 102 and test module 106. Test module 106 may analyze code-under-test 104 by any suitable process such as symbolically executing code-under-test 104. Test module 106 may generate test cases as a result of the symbolic execution. In one embodiment, test module 106 may analyze the test cases to determine whether the test cases indicate code-under-test 104 contains errors or is valid. Test module 106 may produce results 108, containing, for example, the generated test cases or the results of analyzing the test cases. Results 108 may be provided to a user, stored, or otherwise used to evaluate code-under-test 104.

Figure 2:
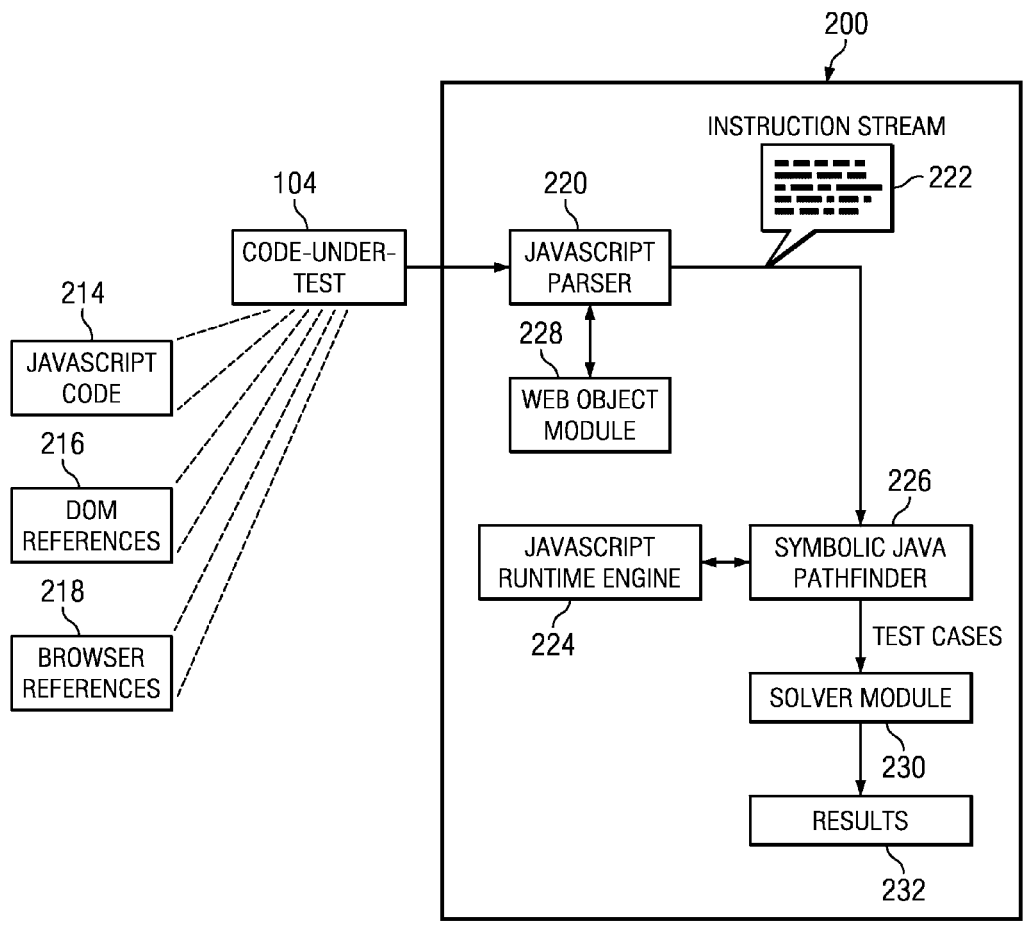
FIG. 2 is a more detailed view of an example embodiment of a test module.

FIG. 2 is a more detailed view of an example embodiment of a test module 200, which may implement fully or in part test module 106 of FIG. 1. Test module 200 may be configured to symbolically execute code-under-test 104 and automatically generate test cases based on the symbolic execution. In one embodiment, test module 200 may be configured to analyze the test cases to validate or determine errors in code-under-test 104. To conduct symbolic execution of JavaScript code, test module 200 may be configured to perform a hybrid of Java and JavaScript execution.

Test module 200 may include a JavaScript parser 220, web object module 228, symbolic Java executor (such as symbolic Java pathfinder 226), JavaScript run-time engine 224, and solver module 230. JavaScript parser 220 may be communicatively coupled to symbolic Java pathfinder 226 and to web object module 228. Symbolic Java pathfinder 226 may in turn be communicatively coupled to JavaScript runtime engine 224 and to solver module 230, which may be configured to produce results 232.

Code-under-test 104 may contain code that is to be evaluated, tested, or validated and may be implemented in, for example, a file, record, database, or any other suitable entity. Code-under-test 104 may include one or more portions of code, including JavaScript code 214, DOM references 216, and browser references 218. Browser references 218 may include references to web browser objects and functions. Results 232 may be implemented in any suitable manner, such as a file, record, data structure, or database, and include results 108 from FIG. 1.

JavaScript parser 220, web object module 228, symbolic Java pathfinder 226, JavaScript run-time engine 224, and solver module 230 may each be implemented in any suitable manner, such as a program, software, library, application, script, function, software-as-service, analog or digital circuitry, or any combination thereof. Although each of JavaScript parser 220, web object module 228, symbolic Java pathfinder 226, JavaScript run-time engine 224, and solver module 230 are shown as separate components, any of these may be combined with another component, shown or not shown, and still perform the functionality described herein. JavaScript parser 220, web object module 228, symbolic Java pathfinder 226, JavaScript run-time engine 224, and solver module 230 may each implement some or all of test module 106 from FIG. 1. JavaScript parser 220, web object module 228, symbolic Java pathfinder 226, JavaScript run-time engine 224, and solver module 230 may each be implemented in common or distinct modules, and such modules may be implemented as a complete module or as sub-modules as part of a larger system. In software form, some or all of JavaScript parser 220, web object module 228, symbolic Java pathfinder 226, JavaScript run-time engine 224, and solver module 230 may be implemented by, for example, logic, instructions, binaries, object code, libraries, functions, programs, applications, scripts, executables, or other suitable digital entity.

In one embodiment, JavaScript parser 220 and JavaScript runtime engine 224 may be adapted, changed, modified, or otherwise repurposed from a traditional JavaScript interpreter. JavaScript parser 220 and JavaScript runtime engine 224 may have been changed to implement the functionality of test module 200 as described herein. In a further embodiment, JavaScript parser 220 and JavaScript runtime engine 224 may have been so adapted from the JavaScript interpreter known as Rhino JavaScript parser 220 and JavaScript runtime engine 224 may not form a complete JavaScript interpreter. For example, JavaScript parser 220 and JavaScript runtime engine 224 may be configured to work without a concrete interpreter, which would fully execute received JavaScript code.

JavaScript parser 220 may be configured to receive code-under-test 104, or a portion thereof. Further, JavaScript parser 220 may be configured to parse code-under-test 104 to determine portions that may be represented as Java bytecodes and portions that are specific to JavaScript. In one embodiment, JavaScript parser 220 may be limited to the parsing as implemented in generally available JavaScript interpreters, such as Rhino In another embodiment, JavaScript parser 220 may include traditional JavaScript parsing used in JavaScript interpreters, but may be modified to enhance the ability of test module 200 to translate some JavaScript-specific portions of code-under-test 104 or instruction stream 220 into instructions that can be handled by a traditional Java execution engine. In yet another embodiment, such translation capabilities may be implemented by another portion of test module 200 such as symbolic Java pathfinder 226. In still yet another embodiment, such translation may be implemented on-the-fly or on-demand by another portion of test module 200 such as symbolic Java pathfinder 226, wherein the received Java-specific portions are translated as needed.

Test module 200 might not be capable of fully translating JavaScript into Java due to any number of issues, such as inherent incompatibilities between the two languages. However, test module 200 may be configured through, for example, JavaScript parser 220 to partially translate JavaScript into instruction stream 222 including Java bytecodes and indications of JavaScript-specific instructions or components. As described below, instruction stream 222 may be executed by a Java runtime engine or Java virtual machine, such as symbolic Java pathfinder 226, configured to execute the Java bytecodes and make special use of a JavaScript runtime engine to access the JavaScript-specific instructions or components.

Any suitable or feasible JavaScript-specific components may be translated into instructions native to Java or otherwise made readable by a Java execution engine. For example, basic data structures and operations in JavaScript may be implemented directly with their equivalent data structures and operations in Java. JavaScript-specific data structures and operations thereof, if not translatable, may be included in instruction stream 222 in their JavaScript-specific state. Regardless of whether a given data structure is translated or not, an instance of it may be designated for symbolic execution. Various semantics and functions in JavaScript may not be translatable due to differences between JavaScript and Java, such as type conversion or higher order functions. Thus, these may be included in instruction stream 222 in their JavaScript-specific state.

As described above, references to various web components such as DOM references 216 or browser references 218 may be made with the assumption that, for example, a JavaScript execution environment would be available to natively understand the context of such references, or that instances of an object are already created and available for operation. Some of such references may be translatable such that they may be used in a Java execution environment.

JavaScript parser 220 may be configured to translate one of DOM references 216 or browser references 218 by accessing web object module 228. Web object module 228 may be configured to store one or more prototypes, data structures, object models, or other information on DOM or browser objects accessible to JavaScript. In one embodiment, JavaScript parser 220 may be configured to create Java code that reflects the accessed object in code-under-test. JavaScript parser 220 may create such Java code using the reference in code-under-test 104 (such as on of DOM references 216 or browser references 218) in combination with the information received from web object module 228. In such an embodiment, a Java execution engine may simply access and run this Java code. In another embodiment, JavaScript parser 220 may be configured to create executable JavaScript code that reflects the accessed object in code-under-test. JavaScript parser 220 may create such code by combining the reference in code-under-test 104 (such as one of DOM references 216 or browser references 218) with the information received from web object module 228. In such an embodiment, a Java execution engine may make special use of a JavaScript runtime engine to access the JavaScript-specific instructions forming the reference.

JavaScript parser 220 may be configured to make the translation of one of DOM references 216 or browser references 218 at any suitable time. In one embodiment, JavaScript parser 220 may be configured to make such translations when translating other portions of code-under-test 104. In another embodiment, JavaScript parser 220 may be configured to delay such translation and subsequent loading. For example, JavaScript parser 220 may place markers, events, or other indications of such references into instruction stream 222 so that a Java engine processing instruction stream may demand translation on-the-fly. Such an embodiment may be utilized for cases where JavaScript parser 220 has translated an object into JavaScript code, rather than into Java code. In another example, an attempted access by one of DOM references 216 or browser references 218 may be preserved in instruction stream 222 as JavaScript-specific content. When such references are reached during the execution of instruction stream 222, the executor (such as symbolic Java pathfinder 226) may be configured to access JavaScript runtime engine 224 and JavaScript parser 220 to build the object in question. As mentioned above, the object may be built in, for example, Java code or JavaScript code as appropriate. The object may then be loaded into the Java executor.

Web object module 228 may be implemented by any suitable mechanism. In one embodiment, web object module 228 may be implemented by a parser from the EnvJS simulated browser environment. Such a parser may include an html5/xml parser. Web object module 228 may be configured to provide models for any suitable object, including HTML DOM objects such as Document, Events, Elements, Anchor, Area, Base, Body, Button, Form, Frame/IFrame or browser objects such as Windows, Navigator, Screen, History, or Location.

A later user of instruction stream 222, such as a Java execution engine, may determine that a given portion of instruction stream 222 is JavaScript-specific, and may make use of a JavaScript runtime engine to utilize the JavaScript-specific portion. In one embodiment, the Java execution engine may be configured to identify the contents as JavaScript-specific. In another embodiment, an indication or marker of the JavaScript-specific nature of any portion of code-under-test 104 may be made in instruction stream 222.

As described above, instruction stream 222 may include one or more Java bytecodes and one or more indications of JavaScript-specific instructions. Instruction stream 222 may be produced all at once or on a rolling basis, depending upon the operation of test module 200 to process code-under-test 104. JavaScript parser 220 may provide instruction stream 222 to any suitable Java execution engine, such as symbolic Java pathfinder 226, for executing instruction stream 222.

Symbolic Java pathfinder 226 may be configured to execute instruction stream 222 in any suitable manner. In one embodiment, symbolic Java pathfinder 226 may be configured to directly execute Java bytecodes in instruction stream 222 and to access a JavaScript engine, such as JavaScript runtime engine 224, to facilitate JavaScript-specific portions of instruction stream 222. Symbolic Java pathfinder 226 may be configured to call JavaScript runtime engine 224 using an application programming interface or other suitable mechanism. JavaScript runtime engine 224 may be configured to perform operations as instructed by symbolic Java pathfinder 226. Symbolic Java pathfinder 226 may be configured to perform some of the translation operations described above in association with JavaScript parser 220.

JavaScript runtime engine 224 may be configured to conduct JavaScript operations as instructed by symbolic Java pathfinder 226. JavaScript runtime engine 224 may be configured to return values to symbolic Java pathfinder 226 by, for example, returning function parameters or writing values to memory. In one embodiment, JavaScript runtime engine 224 may itself be written in Java, and thus its code for conducting JavaScript-specific operations may be executed within symbolic Java pathfinder 226.

While symbolic Java pathfinder 226 may be configured to delegate JavaScript-specific operations to JavaScript runtime engine 224, symbolic Java pathfinder 226 may be configured to maintain corresponding information necessary to perform its functions, such as symbolic execution. For example, for a given JavaScript variable, symbolic Java pathfinder 226 may delegate typing and casting of the object to JavaScript runtime engine 224. JavaScript runtime engine 224 may establish and maintain the type, syntax, scope, and other information about the variable. Symbolic Java pathfinder 226 may maintain information about the variable relevant to symbolic execution. Thus, an access to the variable in instruction stream 222 may first trigger a delegation to JavaScript runtime engine 224 to determine a type or type conversion, and then an access by symbolic Java pathfinder 226 to the actual or symbolic value. In another example, a JavaScript function call may be delegated to JavaScript runtime engine 224. JavaScript runtime engine 224 may be configured to pre-process the function with respect to its semantics, parameters and the scope thereof, and subsequent instructions. JavaScript runtime engine 224 may be configured to communicate with symbolic JavaScript pathfinder 226 to hand off processing of the function. In one embodiment, symbolic JavaScript pathfinder 226 may then symbolically execute the function in the Java domain.

Any suitable mechanism may be used for symbolic Java pathfinder 226 and JavaScript runtime engine 224 to access each other's functionality. In one embodiment, they may include various application programming interface functions accessible by the other. In addition to the interoperation described above, functions may be provided for designating that a given variable is to be executed symbolically. In another embodiment, portions of symbolic Java pathfinder 226 may be modified or written to incorporate functionality of JavaScript runtime engine 234. For example, the ability to handle common JavaScript objects and associated functions such as JS Boolean, JS Number, JS String, JS Global, JS RegExp, JS Array, JS Date, and JS Math may be included in symbolic Java pathfinder 226.

As symbolic Java pathfinder 226 may be configured to symbolically execute code-under-test 104, symbolic Java pathfinder 226 may be configured to intercept all attempted JavaScript operations on regular expressions. Provisions for symbolic execution may have been added to code-under-test 104 in the form of various searches or other operations for regular expressions. Such provisions may have been written in JavaScript and may include naming or other markers. Thus, symbolic Java pathfinder 226 may be configured to recognize JavaScript regular expression operations associated with symbolic execution. For these, symbolic Java pathfinder 226 may be configured to model the regular expression in question with a Java object, and conduct regular expression operations through the object's functions.

Symbolic Java pathfinder 226 may be configured to determine through any suitable mechanism what components of instruction stream 222 are to be symbolically executed. In one embodiment, the components of instruction stream 222 may derive from portions of code-under-test 104 with special names or other markers indicating such symbolic execution. In another embodiment, such names or markers may have been added by JavaScript parser 220. In yet another embodiment, symbolic Java pathfinder 226 may be configured to recognize objects and structures used in symbolic execution, such as regular expressions, and treat them accordingly.

Symbolic Java pathfinder 226 may be configured to conduct symbolic execution on code-under-test 104 in its form in instruction stream 222 in any suitable manner. The symbolic execution may include a program verification technique that systematically explores the different paths in a program. Included in such systematic exploration may be sequences of particular function calls that form a given path. Symbolic Java pathfinder 226 may be configured to analyze conditional branch points in an instruction sequence. Such conditional branch points may include, for example, if-then-else statements or conditional loops. The result of symbolically executing the symbolic test driver may include test cases to be analyzed by solver module 230. The test cases may include sequences of instructions, paralleling code-under-test 104, with specified input variables. The test case may include sequences of functional calls and input vectors, or variable values that form a particular path. Further, the test cases may include constraints on the available range of a given variable. The constraints may be determined through, for example, the design and operating parameters of code-under-test 104 or through symbolic execution. The constraints may include equations or logical conditions.

Multiple such test cases may be created given a conditional branch point, wherein one test case shows the execution given one possible outcome of the conditional branch, and another test case shows the execution given a different possible outcome of the conditional branch. Further, multiple such test cases may be created using different possible values for the variables. Execution of the test cases may or may not be possible under such constraints.

Solver module 230 may be configured to execute the test cases and evaluate whether the results in view of the constraints validate code-under-test 104. If the results of executing the test cases violate the constraints, then solver module 230 may be configured to determine that, for example, a bug, error, or security violation exists in code-under-test 104 represented by the test cases. If the results of executing the test cases do not violate the constraints, then solver module 230 may be configured to validate code-under-test 104 represented by the test cases, at least given the existing constraints. Solver module 230 may be configured to reexamine test cases representing code-under-test 104 in view of new constraints as they are determined by, for example, symbolic Java pathfinder 226. After evaluating the test cases, solver module 230 may be configured to advise symbolic Java pathfinder 226 of whether to stop or to continue symbolically executing code-under-test 104. Solver module 230 may be configured to make such a determination through any suitable mechanism, such as determining whether a certain amount of test coverage has been performed, or a certain limit of resources (such as iterations or time) have been expended. After determining whether a test or resource boundary has been met, solver module 230 may be configured to advise symbolic Java pathfinder 226 of whether to stop or to continue to evaluate code-under-test 104. Test engine 210 may be configured to produce results 232.

In operation, code-under-test 104, possibly containing JavaScript code 214, HTML DOM references 216, and browser references 218, may be provided to test module 200. JavaScript parser 220 may translate code-under-test 104 into instruction stream 222 to include Java bytecodes and JavaScript-specific components. Some JavaScript-specific components may be translated into Java equivalents. JavaScript parser 220 may access web object module 228 to determine how to create objects for HTML DOM references 216 or browser references 218. Such objects may be created in Java or JavaScript, as appropriate. JavaScript parser 220 may send instruction stream 222 to symbolic Java pathfinder 226.

Symbolic Java pathfinder 226 may execute the contents of instruction stream 222. Symbolic Java pathfinder 226 may execute native Java bytecodes directly, translate certain JavaScript-specific components and execute the components directly, or call specially adapted functions to execute the JavaScript-specific components directly. For other JavaScript-specific components, symbolic Java pathfinder 226 may access JavaScript runtime engine 224. JavaScript runtime engine 224 may be accessed by specific function calls or by being embedded within symbolic Java pathfinder 226. JavaScript runtime engine 224 may handle JavaScript-specific operations such as semantics, typing, or other operations, while symbolic Java pathfinder 226 may actually access the underlying objects, variables, or functions.

Symbolic Java pathfinder 226 may perform such execution in order to symbolically execute code-under-test 104. Based on such symbolic execution, symbolic Java pathfinder 226 may generate one or more test cases including constraints, equations, and other information necessary to evaluate code-under-test 104. Symbolic Java pathfinder 226 may send the test cases to solver module 230, which may evaluate the test cases in view of constraints. If such test cases can be solved under the constraints, code-under-test 104 may be validated. Otherwise, code-under-test 104 may be determined to contain one or more bugs, errors, or security violations. Solver module 230 may produce results 232.

Figure 3:
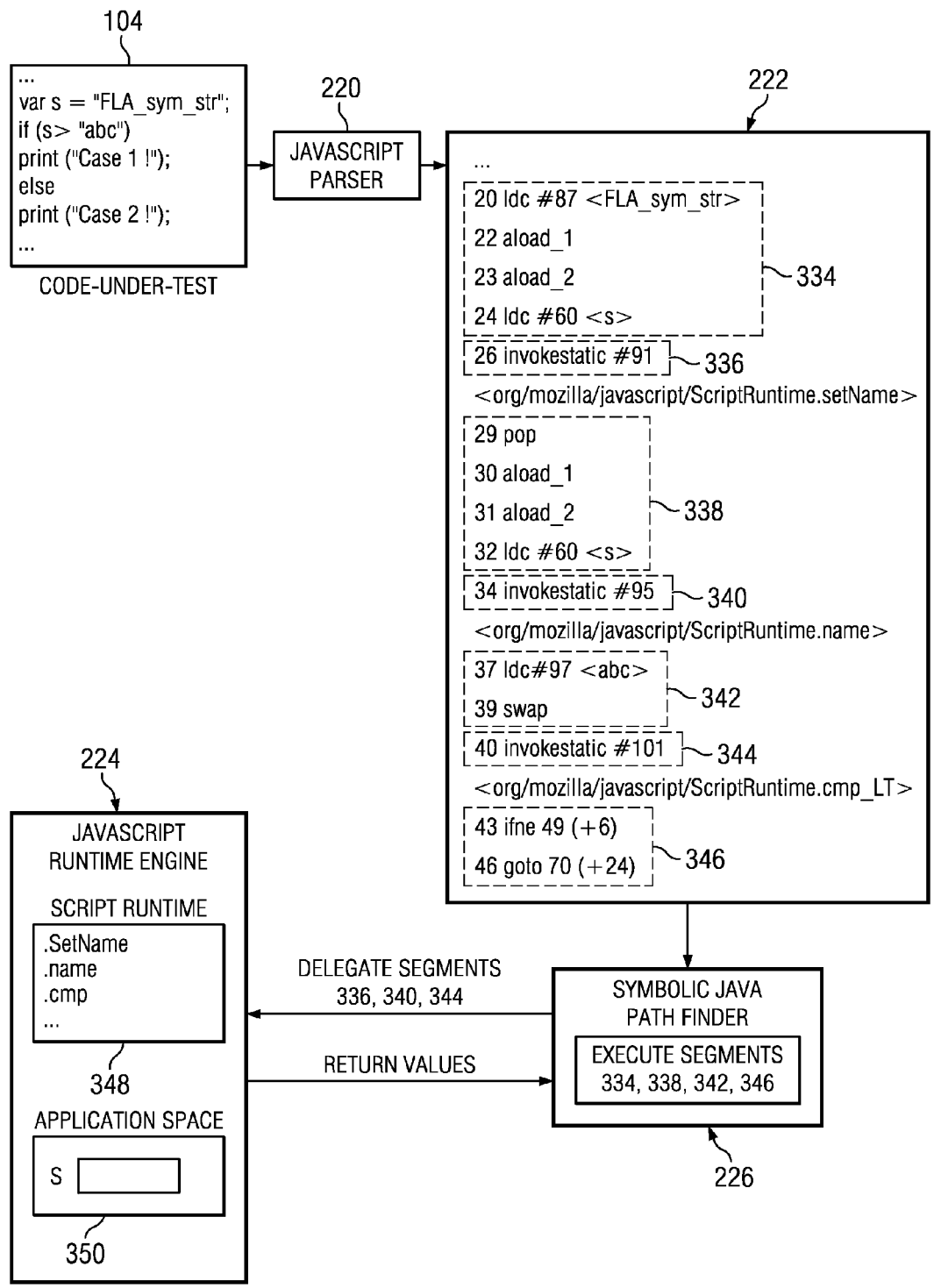
FIG. 3 is a more detailed illustration of the operation of a system with respect to generating and executing an instruction stream.

FIG. 3 is a more detailed illustration of the operation of system 200 with respect to generating and executing instruction stream 222. Code-under-test 104 may contain a segment of code including:

```
var s = "FLA_sym_str";
if (s > "abc")
    print ("Case 1!");
else print ("Case 2!");
```

The code may designate the variable s as a string to be executed symbolically.

JavaScript parser 220 may be configured to convert this code segment from code-under-test 104 into instruction stream 222. The contents of instruction stream 222 in FIG. 3 show the results of parsing the above example code. For illustrative purposes, Java bytecode sets 334, 338, 342, 346 and JavaScript-specific components 336, 340, 344 have been explicitly noted. Java bytecode set 334 and Java bytecode set 338 may be configured to load the specified string and the variable into memory. However, the operations to allocate the variable and assign the string to the variable may be JavaScript-specific semantic operations and thus shown in JavaScript-specific component 336 and JavaScript-specific component 340, which may be references to memory locations of the specific functions in JavaScript runtime engine 224. The logical location and designation of the functions ("/path/Script.Runtime.setName" and "/path/Script.Runtime.name") are provided for the sake of clarity. Following these, Java bytecode set 342 may load the string "abc" into memory and prepare for a comparison operation and JavaScript-specific component 344 may invoke the comparison operation itself and return the value. Following the comparison, Java bytecode set 346 may provide memory branch operations based on the results of the comparison.

Symbolic Java pathfinder 226 may receive instruction stream 222 and execute and delegate the appropriate portions thereof. For example, symbolic Java pathfinder 226 may execute Java bytecode set 334 and then use JavaScript runtime engine 224 to handle JavaScript-specific component 336. JavaScript runtime engine 224 may contain an object such as ScriptRuntime 348, which may contain functions .setName, .name, or .cmp, which may be accessible by symbolic Java pathfinder 226. Symbolic java pathfinder 226 may reference such functions specifically to appropriately handle a given JavaScript-specific component. JavaScript runtime engine 224 may return values to symbolic Java pathfinder 226 or write values into an application space 350 resident in memory. Although application space 350 is shown within JavaScript runtime engine 224, it may be located external to JavaScript runtime engine 224, internal to symbolic Java pathfinder 226, or in a location accessible to either entity. Symbolic Java pathfinder 226 and JavaScript runtime engine 224 may repeat these actions for additional portions of instruction stream 222, such as Java bytecode sets 338, 342, 346 and JavaScript-specific components 340, 344.

Figure 4:
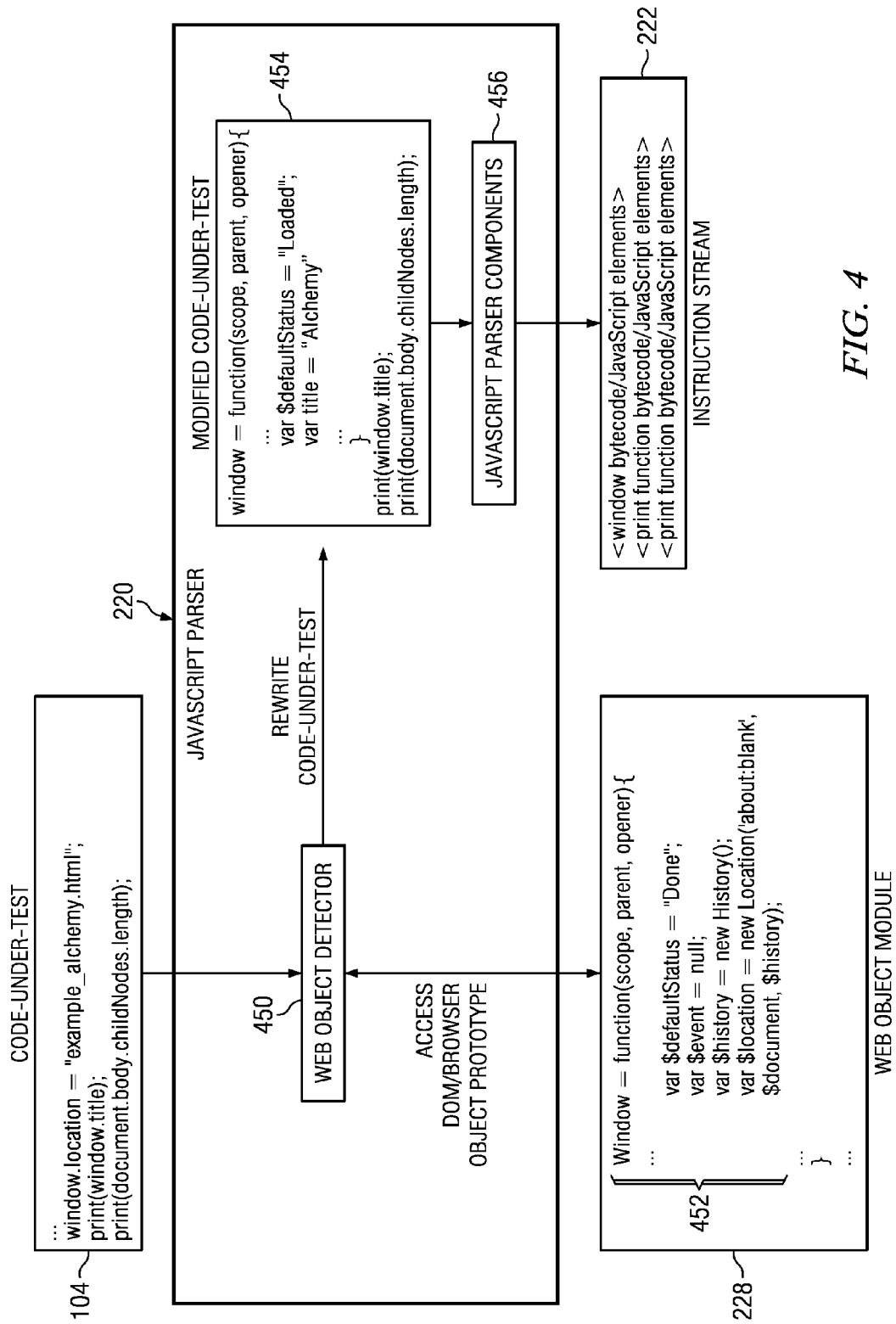
FIG. 4 is a more detailed illustration of the operation of a test module with respect to generating an instruction stream for web-related objects.

FIG. 4 is a more detailed illustration of the operation of test module 200 with respect to generating instruction stream 222 for web-related objects, such as HTML DOM and browser objects. Code-under-test 104 may contain several references to such an object, such as

```
window.location = "example_alchemy.html";
print(window.title);
print(document.body.childNodes.length);
```

In one embodiment, code-under-test 104 may not contain any statements or instructions creating an instantiation of such objects because the JavaScript code referencing the object may assume that the object already exists within the execution environment, or that the JavaScript interpreter will understand the reference. Accordingly, for at least the first such reference, or for a function call assigning a value to such an object, test module 200 may create an object in Java or JavaScript.

JavaScript Parser 220, or another appropriate portion of test module 200, may include any suitable mechanism for creating the object in Java or JavaScript. For example, JavaScript Parser 220 may include a web object detector 450 configured to determine the need for such objects and to create them. Web object detector 450 may be implemented by any suitable software, function, library, application, script, or other suitable mechanism. Web object detector 450 may determine from code-under-test 104 that one or more HTML DOM or browser objects are contained therein. Further, web object detector 450 may determine whether such an object has already been created. If no such object has been created, web object detector 450 may access web object module 228 to retrieve an appropriate prototype for the object.

Web object module 228 may contain any suitable number or kind of prototypes of objects for implementation in Java or JavaScript. For example, web object module 228 may contain a window prototype 452. Window prototype 452 may define the type, scope, functions, variables, and other information regarding a Window object. The definitions may be provided in JavaScript or Java as appropriate to the object. In the example code given above, references are made to a Window object. Consequently, web object module 228 may provide window prototype 452 to web object detector 450.

Web object module 228 may create instructions to instantiate an object of the received prototype and populate the various portions of the prototype with values inferred or discovered from code-under-test 104. Web object module 228 may modify code-under-test 104 to include the newly created instructions to produce modified code-under-test 454. The modified code-under-test 454 may continue to be processed by JavaScript parser 220 using other JavaScript parser components 456, according to the descriptions of test module 200 herein. JavaScript parser 220 may thus produce an instruction stream 222 containing the original and newly created instructions regarding the object.

In the example provided in FIG. 4, web object detector may create an instance of the Window object by inserting code into modified code-under-test 454 corresponding to the instructions in Window prototype 452. Specific variables may be populated, such as "$defaultStatus" set to "loaded" and "title" set to "Alchemy". Such variable values may have been derived from the contents of code-under-test 104, wherein the reference is made to "example_alchemy.html" or the references indicate that the window is actually being used. The inserted code reflecting the creation of the web object may be accompanied by one or more of the original additional web references, such as "print(window.title)", which reflect use of the object once it has been created.

Once modified code-under-test 454 has been created and translated into instruction stream 222, it may contain resulting Java bytecodes and JavaScript-specific elements. As the object may have been created using Java or JavaScript, the resulting code-under-test 454 may be accomplished by native execution in symbolic Java pathfinder 226 alone, or by a combination of such native execution and additional calls to JavaScript runtime engine 224.

Figure 5:
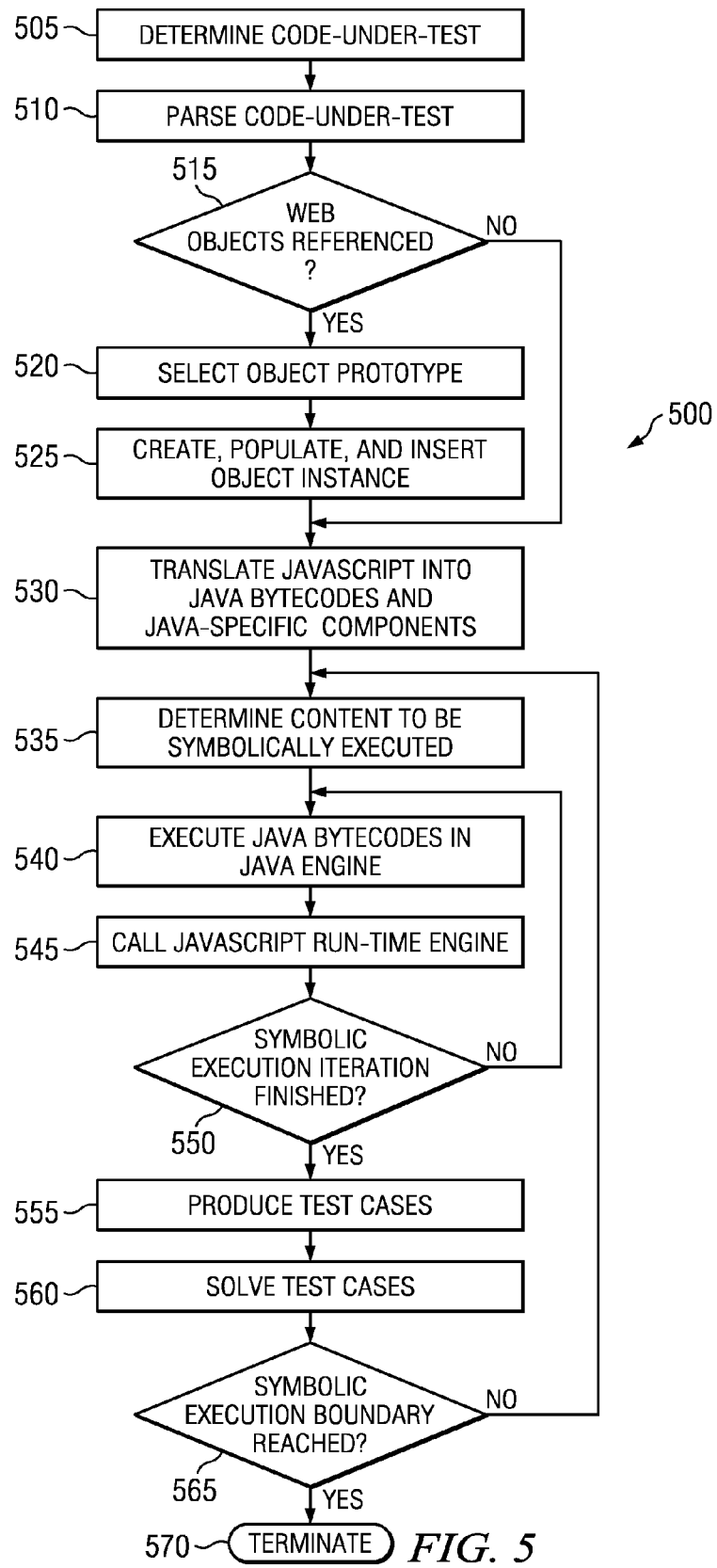
FIG. 5 is an illustration of an example method for symbolic execution and automatic test case generation for JavaScript programs.

FIG. 5 is an illustration of an example method 500 for symbolic execution and automatic test case generation for JavaScript programs. In step 505, code-under-test may be determined. The code-under-test may include all or a portion of software to be evaluated. Furthermore, the code-under-test may be created as an initialization of an instance of an object. The code-under-test may include sequences of instructions received from the execution of another instance of method 700.

In step 510, the code-under-test may be parsed. Parsing the code-under-test may be conducted in any suitable manner. In one embodiment, parsing the code-under-test may be conducted with a parser adapted and modified from an existing JavaScript interpreter. In step 515, during the parsing, it may be determined whether one or more web objects have been referenced. Such objects may be referenced by JavaScript code that assumes the objects are known within an executor. However, such an assumption may be incorrect as method 500 may be conducted on a Java execution environment, rather than on a pure JavaScript interpreter. The objects may include, for example, HTML DOMs or browser objects.

If such web objects are referenced, in step 520 an object prototype associated with the reference may be retrieved. The object prototype may include instructions defining and encompassing an instance of the object that was referenced in the code-under-test. The instructions may be written in, for example, Java or JavaScript. In step 525, code may be inserted into the code-under-test creating an instance of the object using the object prototype. Instructions for populating, creating, or executing various portions of the object prototype instance may be included. Such instructions may be based upon the use of the object in the reference in the code under test. In one embodiment, step 520 or step 525 may be executed when the associated code-under-test is accessed by an execution engine, rather than during parsing. Steps 520-525 may be conducted at least once for each different instance of an object that is referenced in the code-under-test.

If no such web objects are referenced, or upon the completion of step 525, in step 530 the code-under-test may be translated into a combination of Java bytecodes and Java-specific components. Step 525 may be conducted during parsing of code-under-test and upon execution by a Java execution engine.

In step 535, content to be symbolically executed may be determined. Such content may include variables, functions, or other portions of the code-under-test. The determination may be made by discovering markers or other indications in code-under-test. The content to be symbolically executed may be related to specific constraints under which the code-under-test is being tested.

In step 540, Java bytecodes may be executed in a Java engine. The bytecodes may be configured for the desired symbolic execution. Further, additional JavaScript-specific components may be translated into Java bytecodes and subsequently executed. In step 545, a JavaScript run-time engine may be called to handle semantics and other JavaScript-processing of the JavaScript-specific components. Values may be returned from the JavaScript run-time engine by, for example, parameters or writes to shared memory. The JavaScript-specific components may be configured for the desired symbolic execution. In step 550, if the desired symbolic execution iteration has not finished, steps 540 and 545 may be repeated. If the desired symbolic execution iteration has finished, then method 500 may proceed to step 555.

In step 555, test cases resulting from the symbolic execution in the iteration of steps 540 and 545 may be produced. Such test cases may include constraints on possible values of variables, parameters, functions, or other portions of the code-under-test.

In step 560, the test cases may be solved. If the test cases can be solved, then the code-under-test in question may be validated in view of the symbolic execution and its constraints. If the test cases cannot be solved, then it may be determined that the code-under-test contains one or more errors, bugs, or security flaws. The results of solving the test cases may be produced, displayed, or stored.

In step 565, it may be determined whether a boundary condition for symbolic execution has been reached. Such a condition may include depth of execution, number of iterations, time, or another suitable metric. If the boundary condition has not been reached, then method 500 may return to step 535 to determine additional content to be symbolically executed. If the boundary condition has been reached, then method 500 may terminate in step 570.

Although FIG. 5 discloses a particular number of steps to be taken with respect to example method 500, method 500 may be executed with more or fewer steps than those depicted in FIG. 5. In addition, although FIG. 5 discloses a certain order of steps to be taken with respect to method 500, the steps comprising method 500 may be completed in any suitable order. Further, various steps of method 500 may be conducted in parallel with each other.

Method 500 may be implemented using the system of FIGS. 1-4 or any other system, network, or device operable to implement method 500. In certain embodiments, method 500 may be implemented partially or fully in software embodied in computer-readable media. For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, and other tangible, non-transitory media; and/or any combination of the foregoing.

Although the present disclosure has been described in detail, it should be understood that various changes, substitutions, and alterations can be made hereto without departing from the spirit and the scope of the disclosure.

What is claimed is:

1. A method comprising, by one or more computing devices:
   determining JavaScript statements to be evaluated, the JavaScript statements configured for execution on a computing device;
   parsing the JavaScript statements;
   translating the JavaScript statements into a set of Java bytecodes and JavaScript-specific instructions configured to conduct symbolic execution of one or more portions of the JavaScript statements;
   determining a document object model reference in the JavaScript statements;
   determining a set of instructions representing the document object model;
   modifying the set of instructions to include information from the document object model reference;
   executing the Java bytecodes in a Java execution engine;
   adding the modified set of instructions to the set of Java bytecodes and JavaScript-specific instructions upon access of the document object model reference by the Java execution engine;
   calling a JavaScript run-time engine from the Java execution engine;
   handling one or more semantic operations associated with the JavaScript-specific instructions through use of the JavaScript run-time engine; and
   providing return values to the Java execution engine;
   wherein the symbolic execution includes evaluating the JavaScript statements by maintaining a symbolic value of the translated JavaScript-specific instructions in the translated Java bytecodes while the JavaScript run-time engine handles semantic operations associated with the translated JavaScript specific instructions.

2. The method of claim 1, further comprising:
   determining a web browser object reference in the JavaScript statements;
   determining a set of instructions representing the web browser object reference;
   modifying the set of instructions to include information from the web browser object reference; and
   adding the modified set of instructions to the set of Java bytecodes and JavaScript-specific instructions.

3. The method of claim 1, wherein calling a JavaScript run-time engine from the Java execution engine is conducted by directly executing one or more portions of the JavaScript run-time engine in the Java execution engine.

4. The method of claim 1, further comprising interpreting JavaScript statements within the Java execution engine.

5. A system comprising:
   a computer-readable medium comprising computer-executable instructions; and
   one or more processors coupled to the computer-readable medium and operable to read and execute the instructions, the one or more processors being operable when executing the instructions to:
   determine JavaScript statements to be evaluated, the JavaScript statements configured for execution on a computing device;
   parse the JavaScript statements;
   translate the JavaScript statements into a set of Java bytecodes and JavaScript-specific instructions configured to conduct symbolic execution of one or more portions of the JavaScript statements;
   determine a document object model reference in the JavaScript statements;
   determine a set of instructions representing the document object model;
   modify the set of instructions to include information from the document object model reference;
   execute the Java bytecodes in a Java execution engine;
   add the modified set of instructions to the set of Java bytecodes and JavaScript-specific instructions upon access of the document object model reference by the Java execution engine;
   call a JavaScript run-time engine from the Java execution engine;
   handle one or more semantic operations associated with the JavaScript-specific instructions using the JavaScript run-time engine; and
   provide return values to the Java execution engine;
   wherein the symbolic execution includes evaluating the JavaScript statements by maintaining a symbolic value of the translated JavaScript-specific instructions in the translated Java bytecodes while the JavaScript run-time engine handles semantic operations associated with the translated JavaScript specific instructions.

6. The system of claim 5, wherein the one or more processors are further operable to:
   determine a web browser object reference in the JavaScript statements;
   determine a set of instructions representing the web browser object reference;
   modify the set of instructions to include information from the web browser object reference; and
   add the modified set of instructions to the set of Java bytecodes and JavaScript-specific instructions.

7. The system of claim 5, wherein calling a JavaScript run-time engine from the Java execution engine is conducted by directly executing one or more portions of the JavaScript run-time engine in the Java execution engine.

8. The system of claim 5, wherein the Java execution engine is configured to interpret JavaScript statements within the Java execution engine.

9. An article of manufacture comprising:
a non-transitory computer-readable medium; and
computer-executable instructions carried on the non-transitory computer-readable medium, the instructions readable by a processor, the instructions, when read and executed, for causing the processor to:
determine JavaScript statements to be evaluated, the JavaScript statements configured for execution on a computing device;
parse the JavaScript statements;
translate the JavaScript statements into a set of Java bytecodes and JavaScript-specific instructions configured to conduct symbolic execution of one or more portions of the JavaScript statements;
determine a document object model reference in the JavaScript statements;
determine a set of instructions representing the document object model;
modify the set of instructions to include information from the document object model reference;
execute the Java bytecodes in a Java execution engine;
add the modified set of instructions to the set of Java bytecodes and JavaScript-specific instructions upon access of the document object model reference by the Java execution engine;
call a JavaScript run-time engine from the Java execution engine;
handle one or more semantic operations associated with the JavaScript-specific instructions using the JavaScript run-time engine; and
provide return values to the Java execution engine;
wherein the symbolic execution includes evaluating the JavaScript statements by maintaining a symbolic value of the translated JavaScript-specific instructions in the translated Java bytecodes while the JavaScript run-time engine handles semantic operations associated with the translated JavaScript specific instructions.

10. The article of claim 9, wherein the one or more processors are further operable to maintain a symbolic value in the Java execution engine associated with the JavaScript-specific instructions.

11. The article of claim 9, wherein calling a JavaScript run-time engine from the Java execution engine is conducted by directly executing one or more portions of the JavaScript run-time engine in the Java execution engine.

12. The article of claim 9, wherein the Java execution engine is configured to interpret JavaScript statements within the Java execution engine.

\* \* \* \* \*